United States Patent [19]
Dobbs et al.

[11] Patent Number: 5,130,789
[45] Date of Patent: Jul. 14, 1992

[54] LOCALIZED IMAGE RECOLORING USING ELLIPSOID BOUNDARY FUNCTION

[75] Inventors: Christopher M. Dobbs, Florence, Mass.; Robert M. Goodwin, Rochester, N.Y.

[73] Assignee: Eastman Kodak Company, Rochester, N.Y.

[21] Appl. No.: 449,163

[22] Filed: Dec. 13, 1989

[51] Int. Cl.$^5$ .............................................. H04N 1/46
[52] U.S. Cl. .................................... 358/75; 358/80
[58] Field of Search ...................... 358/75, 80, 76, 77, 358/78

[56] References Cited

U.S. PATENT DOCUMENTS

| | | | |
|---|---|---|---|
| 4,410,909 | 10/1983 | Ueda et al. | 358/75 |
| 4,464,677 | 8/1984 | Kuhn et al. | 358/75 |
| 4,689,666 | 8/1987 | Hatanaka | 358/75 |
| 4,769,695 | 9/1988 | Terashita | 358/80 |
| 4,837,614 | 6/1989 | Omi | 358/75 |
| 4,931,864 | 6/1990 | Kawamura et al. | 358/75 |
| 4,975,769 | 12/1990 | Arizu et al. | 358/75 |
| 4,989,080 | 1/1991 | Ito | 358/80 |
| 4,992,864 | 2/1991 | Akiyama | 358/75 |

Primary Examiner—Stephen Brinich
Attorney, Agent, or Firm—Edward Dugas

[57] ABSTRACT

A mechanism for recoloring a color image defines a spatial region within the image (such as the pupil of the eye) a color characteristic of which (e.g. the 'red-eye' phenomenon) is to be selectively modified. To determine whether the color of an image sample within a spatial region is to be modified, the value of the chrominance component of each sample within the region is compared with a regularly shaped (e.g. elliptical) chrominance variation discriminator that surrounds a target color of interest (e.g. red, in the case of a 'red-eye' correction). The major axis of the ellipse coincides with the saturation direction of the chrominance plane and its minor axis coincides with the hue direction. For each sampling location within the spatial region, the value of the chrominance component is examined to determine whether it falls within the elliptical chrominance discriminator. If the value of the chrominance component falls within the ellipse, it is modified to a destination chrominance value, based upon where the chrominance value of the sampled of interest falls, so as to soften the color at its edges. The luminance component is modified by an offset based upon the difference in the value of the luminance component of the target color and that of the new color. This luminance value difference is weighted in accordance with the product of the previously determined chrominance weighting coefficient and a prescribed relationship between the geometrical location of the luminance component for the sample of interest and the extent of a prescribed range of luminance variation projected from the elliptical discriminator along the luminance axis of the Y,I,Q coordinate system.

46 Claims, 2 Drawing Sheets

LOCALIZED IMAGE RECOLORING USING ELLIPSOID BOUNDARY FUNCTION

FIELD OF THE INVENTION

The present invention relates in general to color image processing and is particularly directed to a mechanism for controllably recoloring one or more selected regions of a color image using a modification discriminator the boundaries of which are defined in accordance with a regular geometrical shape, such as a circle or an ellipse.

BACKGROUND OF THE INVENTION

Processor-based color correction has become a widely used 'video proofing' tool for a number of image processing applications, such as graphics arts workstations and color photoprinting, wherein modification or 'retouching' of a specific region of an image, for example, the removal of the 'red-eye' phenomenon in a flash color photo containing a human face (or similarly, the green or blue tinge to the eyes of animals) can correct an otherwise less than satisfactory picture. For a discussion of the color correction process, in general, and a number of mechanisms that have been proposed to effect correction or modification of an image, attention may be directed to the U.S. patents to Dalke et al, U.S. Pat. No. 4,488,245, Klie et al, U.S. Pat. No. 4,486,772, Schure et al, U.S. Pat. No. 4,189,743, Kuhn et al, U.S. Pat. No. 4,464,677, Eicher et al, U.S. Pat. No. 4,409,614, Pugsley, U.S. Pat. Nos. 3,893,166, 3,894,178, 3,739,078 and 3,965,289, Heltman et al, U.S. Pat. No. 4,220,965, Dobouney, U.S. Pat. No. 3,600,505, Cousin, U.S. Pat. No. 4,007,327 and Stern, U.S. Pat. No. 4,189,744. In these (patented) systems, such as that described by the Dalke et al, the ability to effect independent precision modification of any selected portion of a digitized color image requires the use of a very large number of signal samples, which inherently increases the signal processing complexity of the process.

SUMMARY OF THE INVENTION

In accordance with the present invention, precision recoloring of one or more selected spatial regions of a color image is accomplished by means of a digital image signal processing mechanism which employs a chrominance modification discriminator that conforms with the tendency of an object's color to exhibit a fairly narrow range of hue over a broader range of saturation. In addition, the mechanism uses weighting coefficients through which chrominance values are corrected to adjust the associated luminance values, so as to allow specular highlights in objects, such as glints in eyes (for correction of the 'red-eye' phenomenon) to be unaffected, while the remainder of the object may be darkened; still, the highlights are color-changed to match the rest of the object.

More particularly, pursuant to a preferred embodiment of the present invention, selective color modification of an image that has been spatially sampled to obtain a plurality of color-representative data values, each of which is associated with a respective sampling location within the image, is effected by initially defining one or more spatial regions within the image (such as the pupil of the eye) a color characteristic of which (e.g. the 'red-eye' phenomenon) is to be selectively modified. In order to determine whether or not the color of an image sample within a spatial region is to be modified, the value of the chrominance component of each sample within the region is compared with a regularly shaped chrominance variation discriminator that surrounds a prescribed 'target' or 'reference' color of interest (e.g. red, in the case of a 'red-eye' correction).

The target color (the 'red eye' color to be changed) may be determined by an operator observing the image of interest displayed on a video monitor. By invoking a video zoom on the image by pixel replication increase its size to where each individual pixel is readily identifiable, and by the manipulation of a mouse or joystick, the operator is able to point to an individual pixel that 'best exemplifies or represents' the color to be changed.

Because an object's color tends to exhibit a fairly narrow range of hue over a broader range of saturation, the color variation characteristic is preferably a regular narrow geometrical shape, such as an elliptically configured chrominance variation characteristic, the major axis of which coincides with the saturation direction of the chrominance plane within a luminance, chrominance (Y,I,Q) coordinate system and the minor axis of which coincides with a direction orthogonal to the saturation direction of the chrominance plane, so that the intersection of the major and minor axes of the elliptical chrominance discriminator coincides with the origin of the chrominance plane centered at the 'target' color.

For each sampling location within the spatial region, the value of the chrominance component is examined to determine whether or not it falls within or without the elliptical chrominance discriminator. If the value of the chrominance component falls within the ellipse, it is modified to a new or 'destination' chrominance value (e.g. that associated with the color black). Otherwise, it is left unaltered. The magnitude of this modification is based upon where, within the discriminator ellipse, the chrominance value of the sample of interest falls.

In particular, the difference between the chrominance value of the sample and the new chrominance value is multiplied by a weighting coefficient, the value of which is dependent upon the separation between the geometrical location (in the chrominance plane) of the chrominance component of the image sample and the border of the ellipse. The resulting product is then summed with the value of the chrominance component of the sample, to obtain a final chrominance value for the modified sample point.

In a similar fashion, the value of the luminance component for the modified sample point is modified by an offset based upon the difference in the value of the luminance component of the target color and that of the new color. This luminance value difference is multiplied by a luminance weighting coefficient that is established in accordance with the product of the previously determined chrominance weighting coefficient and a prescribed relationship between the geometrical location of the luminance component for the sample of interest and the extent of a prescribed range of luminance variation projected from the elliptical discriminator along the luminance axis of the Y,I,Q coordinate system. This luminance value difference is then added as an offset to the luminance value of the sample to obtain a final luminance value for the modified sample point. The modified chrominance and luminance values are then converted into RGB values for application to an image output device (e.g. color display, print engine).

DETAILED DESCRIPTION

Figure 1:
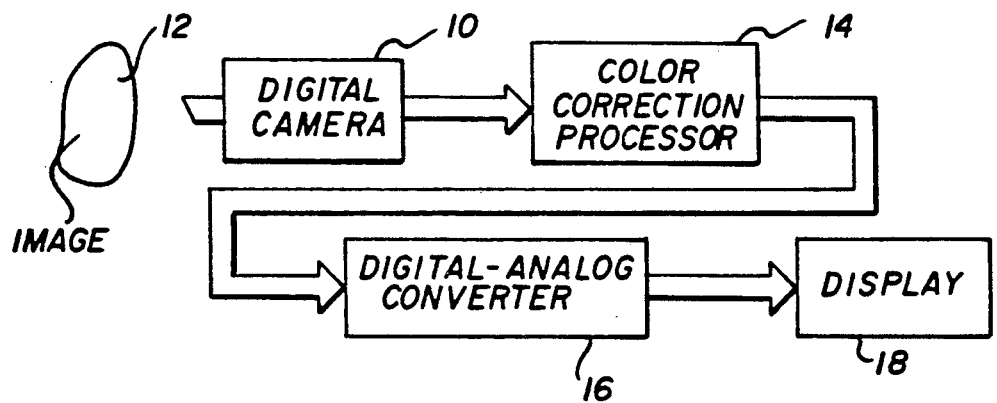
FIG. 1 is a block diagram of a digital image processing system for performing selective color correction of an image.

Before describing in detail the particular improved localized image recoloring mechanism in accordance with the present invention, it should be observed that the present invention resides primarily in a novel combination of signal processing steps that are readily executed using conventional communication and signal processing circuits and components. Accordingly, the structure, control and arrangement of such conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the overall image data compression and transmission system in a convenient functional grouping, whereby the present invention may be more readily understood.

As pointed out previously, the present invention is directed to an improvement in (digital) color image processing and is particularly directed to a mechanism for controllably recoloring one or more selected regions of a color image by means of a color modification discriminator the boundaries of which are defined in accordance with a regular geometrical shape, such as a circle or an ellipse. Because the color image to be controllably modified is sampled and digitally formatted, the recoloring process is readily executed by means of a programmed general purpose digital computer, such as a Fortran-programmed VAX cluster processor, manufactured by Digital Equipment Corporation and, for purposes of the present description, will be understood to be so implemented. However, it should be realized that a custom configured, special purpose digital processor may be employed to carry out the sequence of signal processing steps, through which the color image is selectively corrected, described below.

A block diagram of an overall image processing system is shown in FIG. 1 as comprising an image source 10 such as an image sensor, film scanner or digital image recorder, which outputs digitally encoded, image representative signals representative of the color content (red (R), green (B) and blue (B) color components) of the image at an NXM array of spatial sample points across image 12. These color component representative digital signals are coupled to a programmed general purpose digital computer 14, such as the above-mentioned VAX cluster processor, which is programmed to execute the sequence of signal processing steps to be described below with reference to FIGS. 2-5, and through which the digital color image representative signals output by source 10 are controllably modified, in order to effect the color correction desired. (A program listing of the source code for this program is supplied as a separate appendix A). The modified color image signals from processor 14 are converted into analog format by an digital-to-analog converter 16 and then coupled to a downstream image output device 18, such as a color print engine or display, whereat the color corrected image is reconstructed.

As mentioned briefly above, the color correction mechanism of the present invention allows one or more selected portions of color image having a specified color (and density) to be changed or modified to another color (and density), while leaving the detail, or luminance contour unaffected. A portion of the image which has been selected for color correction is defined in terms of both spatial and colorimetric boundaries, each of which uses simple parameters. As a consequence, objects within a picture, such as 'red-eye's in a flash photo, can be realistically "retouched" or "painted", by means of a relatively simple process.

Figure 2:
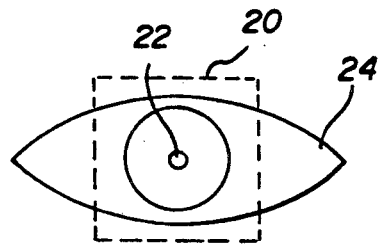
FIG. 2 shows a spatial mask applied for correction of the 'red-eye' phenomenon.

The process begins by defining the spatial region or regions within the object that are to be subjected to the color correction process. Color samples for pixel locations outside the spatial region are excluded or bypassed, being left as-is. With reference to FIG. 2, using the example of a correction of the 'red-eye phenomenon, this means that a spatial mask region, such as rectangular region 20, is defined such that it surrounds the pupil 22, which is to be recolored (to a neutral dark). It should be observed that the shape of mask 20 need not be rectangular, but may be, in general, a polygon or have a curvilinear shape. The rectangular shape of mask 20 is chosen merely as an example, and because of the ease in which it is defined in terms of signal processing parameters. Since the correction mechanism also is dependent upon on chromatic properties of the object, and not simply the extent of the mask boundaries, what is important is that region 20 be sized and shaped to encompass the entirety of the image portion of interest, without encompassing other subject matter of the same target color. In the example shown in FIG. 2, region 20 covers the 'red-eye' pupil 22 and non-discolored eye and facial features (that will not be color corrected because they do not have the same chromatic properties as the pupil).

It should be observed that a single image often contains more than one object to be corrected. In the present example of 'red-eye' correction, two to ten operations for a single image is not uncommon. While the same process could be repeated for each object, in accordance with a preferred embodiment of the invention (and as detailed in the source code listing), all objects are processed within a single operation.

Given the spatial boundaries of the image to which the color correction mechanism applies, the process according to the present invention next examines the color content of each sample point within the masked region. As mentioned above, the target color (the 'red eye' color to be changed) may be determined by an operator observing the image of interest displayed on a video monitor. For this purpose the operator may employ conventional color image processing equipment, such as that manufactured by Recognition Concepts Inc, and invoke its video zoom mechanism, so as to enlarge the color image sufficiently by pixel replication up to a size where each individual pixel is readily identifiable. By manipulation of a mouse or joystick, the operator is able to point to an individual pixel that 'best exemplifies or represents' the color to be changed. Rather than use the color of a particular pixel as the target color, the average of the R, G and B values of this pixel and a specified number of its closest neighbors (e.g. its surrounding eight pixels within a three by three pixel sub-array) is computed.

Because the color signature of an object may be more accurately defined by converting its RGB values to a two-dimensional shape in chrominance space, the color-representative signals for each of the sample locations with mask region 20 in FIG. 2 are converted to their chrominance (I,Q) and luminance (Y) components using a conventional transformation process, such as is employed for color television applications. One suitable set of conversion equations that may be used for this process is:

$$Y = 0.300R + 0.590G + 0.110B$$

$$I = 0.600R - 0.280G - 0.320B$$

$$Q = 0.210R - 0.520G + 0.310B.$$

Alternatively, other luminance, chrominance conversion equations, such as "ATD" and "T SPACE" conversion sets may be used. For a modified "ATD" transform, the equation is:

$$Y = 0.5R + 0.5G + 0.0B$$

$$I(\text{or } Q) = 0.5R - 0.5G + 0.0B$$

$$Q(\text{or } I) = 0.25R + 0.25G - 0.5B.$$

For a "T SPACE" transform, the equation is:

$$Y = 1/\sqrt{3}\, R + 1/\sqrt{3}\, G + 1/\sqrt{3}\, B$$

$$I(\text{or } Q) = -1/\sqrt{6}\, R + 2/\sqrt{6}\, G - 1/\sqrt{6}\, B$$

$$Q(\text{or } I) = 1/\sqrt{2}\, R + 0.0\, G - 1/\sqrt{2}\, B$$

Figure 3:
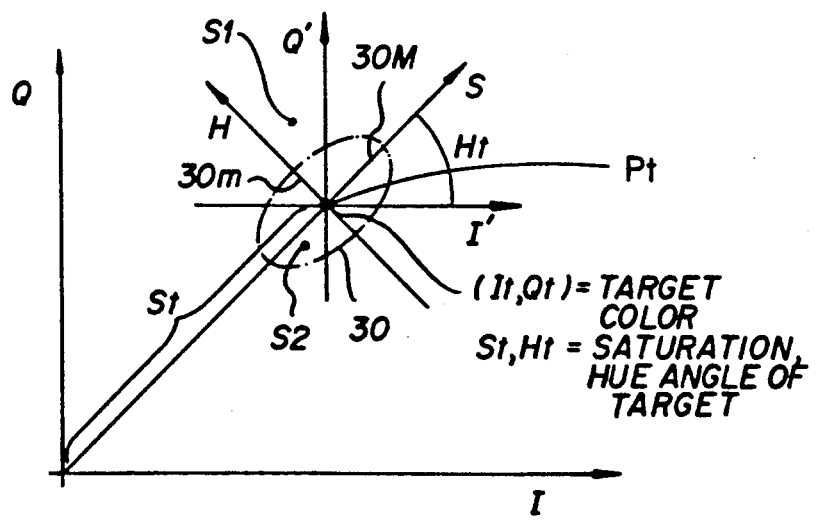
FIG. 3 diagrammatically illustrates a chrominance (I,Q) plane, containing an elliptical chroma-discriminator.

Within the chrominance (I,Q) plane, diagrammatically illustrated in FIG. 3, it has been observed that an object's color tends to exhibit a fairly narrow range of hue, while its saturation covers a broader range. As a consequence, when examining the chrominance components of the object of interest (a red pupil, in the present example) one can expect the chrominance conversion values (I,Q) to be located within a narrow region surrounding the 'target' color (red) that is to be changed. Pursuant to one feature of the present invention, this expectancy is addressed by defining a prescribed geometrical shape, preferably a simple regular shape, such as a circle or an ellipse, about the target color (represented by an average of an operator-selected pixel and some number of surrounding closest neighbor pixels, as described above) and limiting the color correction process to only those color data values within the spatial mask region 20 that are also contained within the chrominance region defined by this shape.

More particularly, as diagrammatically shown in FIG. 3, in the chrominance (I,Q) plane, at the chrominance conversion point Pt for the target color (e.g. red), a saturation distance St (from the origin of the I and Q axes and a hue angle Ht (relative to I axis) are defined. Then, about this target location (I,Q) a range of variation in hue and saturation is delineated by the above-mentioned regular shape, such as an ellipse 30. Because the expected variation in hue is relatively narrow (compared to the degree of variation in saturation) the hue component can be considered to be effectively orthogonal to the saturation component, as identified by axis H, which passes through target point Pt. By placing ellipse 30 such that it is symmetrical about target point Pt and is defined in accordance with a prescribed expectancy of variation in saturation and hue, then geometrically, ellipse 30 will be defined such that its major axis 30M is coincident with the saturation axis S and its minor axis 30m is coincident with the H axis. This ellipse is then used to determine whether or not the color of an image sample that falls within spatial region 20 is to be modified.

For this purpose, for each sampling location that falls within the spatial mask region 20, the value of its chrominance component (Is,Qs) of a respective sample within region 20 is examined to determine whether it falls within the perimeter of ellipse 30, which is effectively centered about the 'target' color Pt. If the chrominance-converted sample falls outside the ellipse, as is the case with sample point S1, it is left unaltered. If the value of the chrominance component falls within the ellipse, as is the case with a sample point S2, it is modified to a new or 'destination' chrominance value (e.g. that associated with the color black). The magnitude of this modification is based upon where, within the 'discriminator' ellipse, namely, how close to the border or perimeter of the ellipse, the chrominance value of the sample of interest falls.

In order to facilitate a determination of where each sample point falls relative to the ellipse, a coordinate system translation is performed, such that the target color Pt is located at the origin and the sample point is defined relative to the new origin. Namely, with (Is,Qs) as the initial coordinates of the sample S and (It,Qt) the coordinates of the target color, then, after the coordinate system translation, the coordinates of sample S will be defined in terms of new axes I' and Q' (centered at Pt) as I's=Is−It, Q's=Qs−Qt and Y's=Ys−Yt.

Following the translation, a rotation (through the hue angle of the target color) is carried out so that the system lies along the saturation direction of the original I and Q coordinate system. Thus, using the above-referenced values Ht as the hue angle of the target color in the I,Q coordinate system and St as the saturation of the targeted color in the I,Q coordinate system, and denoting (S,H) as the new coordinates after the I',Q' system is rotated about the origin through angle Ht, then $$\cos(Ht) = It/St \text{ and}$$

$$\sin(Ht) = Qt/St, \text{ so that}$$

$$S = I's \cdot \cos(Ht) + Q's \cdot \sin(Ht), \text{ and}$$

$$H = -I's \cdot \sin(Ht) + Q's \cdot \cos(Ht).$$

Since as shown in FIG. 3, the ellipse lies along the saturation direction of the target color, centered at the target color, the new coordinates of the current sample represent how its saturation and hue differ from those of the target.

In order to determine whether the chrominance value of the sample lies within the ellipse and must therefore be changed, its distance from the perimeter or border of the ellipse is determined in terms of the equation for the ellipse which may be defined (in terms of its translated and rotated coordinates) as:

$$(S/a)^2 = (H/b)^2 = 1,$$

where a = the extent of the ellipse along its major or saturation axis 30M, and b = the extent of the ellipse along its minor or hue axis 30m.

In the above expression, the actual magnitudes of the 'a' and 'b' parameters will depend upon the scale of the numbers that are used to define the image. At the start of each new image to be processed for 'red-eye' removal, the magnitudes of these parameters are returned to a set of fixed values. For an eight bit (0–255) scaling resolution, the initial values may be 'a' = 10.0 and 'b' = 6.0.

If the LHS of the above equation for the ellipse is greater than one the point lies outside the ellipse and is not corrected. If it is less than one, the sample lies within the ellipse and is modified to a chrominance value associated with a 'destination' color, e.g. black. However, the modification is not simply a substitution of some constant chrominance value for the red pixel sample, but rather involves a tailoring of the corrected value in order to 'soften' the transition and make it appear as realistic as possible.

More specifically, experience has shown that if every sample pixel value that falls within the chrominance discriminator region is changed to a prescribed 'destination' value, while all pixels that lie outside the perimeter of the region remain unchanged, the resulting image will often exhibit an abrupt color edge where the color space transition occurs. Such harsh edges rarely occur in natural scenes and are therefore very noticeable, even though the rest of the image may be perfectly colored. In order to mitigate this artifact, the color change for a sample located within the ellipse is weighted in accordance with how close its location is to the border of the ellipse. The closer to the edge of the ellipse a sample falls, the smaller it is weight or the smaller a fraction of the value of the 'destination' color it becomes, so that for locations that are adjacent to the perimeter of the discriminator the color change will be softened, as diagrammatically illustrated in FIG. 4, thereby preventing the creation of an abrupt color edge in the modified image.

For this purpose, the difference between the chrominance value of the sample and the destination chrominance value is multiplied by a weighting coefficient, the value of which is dependent upon the separation between the geometrical location (in the chrominance plane) of the chrominance component of the image sample and the border of the ellipse. The resulting product is then summed with the value of the chrominance component of the sample, to obtain a final chrominance value for the modified sample point.

The magnitude of the weight is a function of the distance Dc of the pixel value from the ellipse perimeter. This distance Dc from the sample location from the boundary or perimeter of the ellipse may be defined as:

$$Dc = (bS)^2 + (aH)^2 - (ab)^2.$$

Based upon this distance Dc a weight Wc for softening the value of the destination chrominance component (Id,Qd) is determined in accordance with the following expressions:

$$Wc = \tfrac{1}{2} * \text{Exp}(-Dc/\text{Tau}) \ldots \text{ for } Dc >= 0,$$

and $$= 1 - \tfrac{1}{2} * \text{Exp}(Dc/\text{Tau}) \ldots \text{ for } Dc < 0,$$

where Tau is a roll-off constant, determined in accordance with the above-referenced ellipse parameters 'a' or 'b'. For instance, Tau = a*b*0.1.

Using this weight Wc, the finalized chrominance coordinates (If,Qf) of the destination value are defined as:

$$If = Is + (Id - Is) * Wc,$$

and $$Qf = Qs + (Qd - Qs) * Wc.$$

Figure 5:
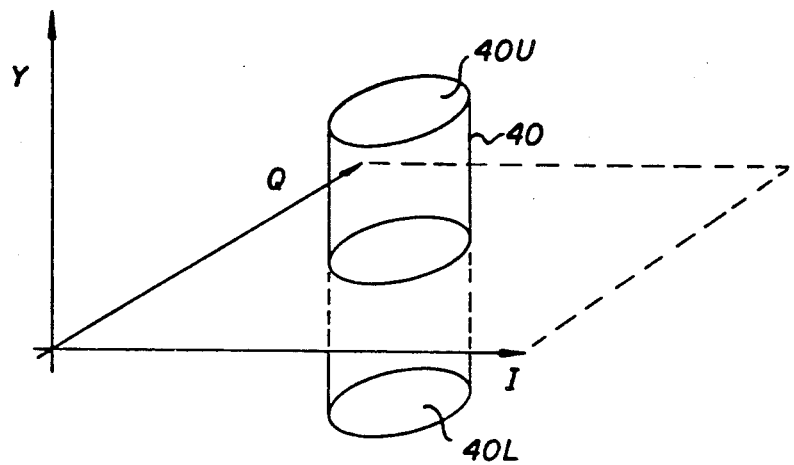
FIG. 5 shows an elliptical cylinder characteristic for a range of luminance values projected orthogonally of the chrominance discriminator plane.
Figure 4:
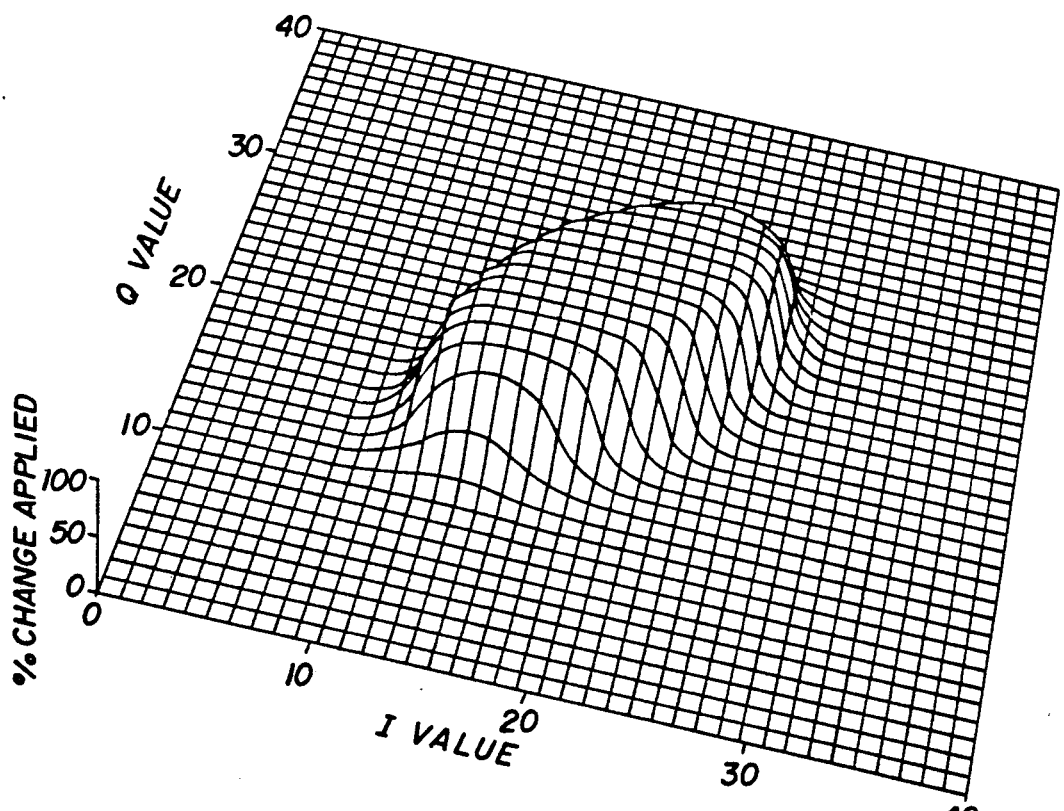
FIG. 4 diagrammatically shows a luminance, chrominance coordinate system in which the color change along the perimeter of an elliptical discriminator is softened.

In addition to controllably modifying the chrominance component, the present invention weights its associated luminance component in accordance with whether or not the luminance component of the sample falls within a range of luminance values that is projected orthogonal to the chrominance discriminator region. Such a characteristic is shown in FIG. 5 as being projected along the luminance axis of the Y,I,Q coordinate system into which the original RGB values of the pixel of interest have been converted, in the form of an elliptical cylinder 40 which has an upper (I,Q) boundary plane 40U and a lower (I,Q) boundary plane 40L.

Using the luminance variance cylindrical surface 40, the original value of the luminance component Ys for the chrominance-modified sample point is adjusted 'by' an offset (based upon the difference in the value of the luminance component Yt of the target color and that Yd of the destination color), rather than 'to' an offset, as in the case of a chroma-correction, described above. As a result, the luminance contour detail of the object is preserved. Furthermore, the luminance change is applied only to pixels that have been chroma-corrected and then only for pixels within the specified luminance range. Such a technique allows specular highlights such as glints in eyes, for red-eye correction, to be left alone, while the rest of the object is darkened.

The luminance value difference (Yd − Yt) is multiplied by a luminance weighting coefficient W1' that is established in accordance with the product of the previously determined chrominance weighting coefficient Wc, described above, and a prescribed relationship W1 between the geometrical location of the luminance component for the sample of interest and the extent of the cylindrical range 40 of luminance variation projected from the elliptical discriminator along the luminance axis of the Y, I, Q coordinate system. This weighted luminance value difference is then added as an offset to the luminance value Ys of the sample to obtain a final luminance value Yf for the modified sample point.

For this purpose, the distance D1 of the current luminance value Ys for the sample of interest from an upper or lower boundary 40U, 40L of the cylindrical surface 40 point is determined in accordance with the expression:

$$D1 = |Ys| - c,$$

where c is the specified range of luminance values as demarcated by upper and lower boundaries 40U and 40L, which, for the above-referenced eight bit scaling resolution, may have an initial value of 'c'=9.0. Like the 'a', 'b' and Tau parameters, 'c' is reset to its initial value at the start of each new image to be processed.

Next, the luminance weight W1 is obtained as:

$$W1 = \frac{1}{2} * Exp(|D1|Tau) \ldots \text{ for } Dl >= 0,$$

and $$= 1 - \frac{1}{2} * Exp(|-Dc|Tau) \ldots \text{ for } Dl < 0,$$

where Tau is the same roll-off constant used for chrominance weight Wc.

In order to affect only those pixels that have been chroma-corrected, the luminance weight W1' is defined as a product of luminance weight W1 and chrominance weight Wc. Namely, $$W1' = W1 * Wc.$$

Thus, for a full scale chrominance change (Wc=1.0), there is a corresponding luminance change. For a fractional chrominance change, the luminance change is weighted by the same fraction.

Using this luminance weight W1', the finalized luminance value of the modified pixel is defined as:

$$Yf = Ys + (Yd - Yt) * W1'.$$

Note that, unlike the calculation of the final If and Qf values the offset difference value (Yd−Yt) is independent of the current pixel value.

With both the modified chrominance (If,Qf) and luminance (Yf) values having been determined, the process converts these values back into the RGB coordinate system, again using a conventional set of YIQ-RGB transformations, such as:

$$R = 0.6240Q = 0.9483I + Y$$

$$G = -0.6398Q - 0.2761I + Y$$

$$B = 1.7299Q - 1.055I + Y.$$

Alternatively, where other luminance, chrominance conversion equations, such as the above-reference "ATD" and "T SPACE" transform sets have been employed, then converting back to RGB values may be accomplished by the following equations.

For a modified "ATD" transform, the equation is:

$$R = 1.0Y + 1.0Q(\text{or } I) + 0.0I(\text{or } Q)$$

$$G = 1.0Y - 1.0Q(\text{or } I) + 0.0I(\text{or } Q)$$

$$B = 1.0Y + 0.0Q(\text{or } I) - 2.0I(\text{or } Q).$$

For a "T SPACE" transform, the equation is:

$$R = 1/\sqrt{3}\ Y - 1/\sqrt{6}\ Q(\text{or } I) + 1/\sqrt{2}\ I(\text{or } Q)$$

$$G = 1/\sqrt{3}\ Y + 2/\sqrt{6}\ Q(\text{or } I) + 0.0\ I(\text{or } Q)$$

$$B = 1/\sqrt{3}\ Y - 1/\sqrt{6}\ Q(\text{or } I) - 1/\sqrt{2}\ I(\text{or } Q)$$

As a final step in the selective color modification process, the RGB values are examined to insure that they fall within acceptable limits. This step is necessary since the changes take place in YIQ space, and too large a shift in any one direction can result in moving outside the color operation range of the system, which may be conveniently defined by the extent over which the RGB values are allowed to vary (e.g. 0–255). One simple solution is to simply clip the final RGB values to this range.

The foregoing selective color modification process may be modified so as to cause the ellipse to be automatically centered in the mass of color representing the color to be changed. The start of this modified procedure is the same as described above (i.e. generating a three by three average and using that average as a temporary center). Next, the ellipse is calculated. However, the weights are calculated without using the roll-off constant Tau. Specifically, weights Wc and W1 are defined as:

| | |
|---|---|
| Wc = 1 | for Dc <= 0, |
| Wc = 0 | for Dc > 0, |
| W1 = 1 | for D1 <= 0, and |
| W1 = 0 | for D1 > 0. |

Next, instead of computing a weighted transformation of the pixels both inside spatial rectangle 20 and inside elliptical cylinder 40, the procedure simply computes a weighted average of the red, green and blue pixels inside the two regions. For all pixels Pi inside these regions:

| |
|---|
| R' = SUM(W1*Wc*Ri)/SUM(W1*Wc) |
| G' = SUM(W1*Wc*Gi)/SUM(W1*Wc) |
| B' = SUM(W1*Wc*Bi)/SUM(W1*Wc) |

The values R', G' and B' are then substituted for the original R, G and B (three by three pixel) averages and the entire process is repeated. At each iteration, the new averages are compared with the old averages. When the difference between the two averages for every color drops below some lower limit, the final averages become the center of the ellipse for the purpose of 'red-eye' removal. In this manner, the ellipse is automatically centered on the mass of color representing the color to be changed.

In order to insure convergence, the size of the elliptical cylinder 40, as defined by parameters 'a', 'b' and 'c', must be adjusted appropriately. To accomplish this for each ellipse center, the parameters must be set back to their initial values. At the completion of the first iteration, weights of the original nine pixels must be examined before the center of the ellipse has been moved, and its size must be made sufficiently large to include some minimum number (e.g. at least eight) of the nine pixels within it (i.e. at least eight pixel locations must have weights equal to one). If the size of the ellipse has not been enlarged during the first iteration and if the procedure wanders away from the mass of red-eye color, rather than toward its center, the parameters must be made even smaller and the procedure restarted at the original three by three average color. This restart may be initiated by the operator based upon his observations that the colors being changed are not the colors originally designated. Alternatively, the process may be restarted automatically if the difference between the locations of ellipse centers at subsequent steps increases rather than becoming smaller. It may also be restarted if more than four of the original nine pixels in the three by three average fall outside the ellipse (i.e. produce a weight of zero).

It should be observed that the above-described red-eye removal mechanism is inherently interactive. First, the operator designates the color to be changed. Then the process uses the initial values for the geometry parameters such as those given above. (The location of the center of the ellipse has been determined initially using the same parameters to start the process. If their values have been temporarily changed in order to insure convergence of the centering process, then they are returned to the above values to start the red-eye removal itself.)

The effect of using the initial values can be observed on the operator's video monitor. The operator can see which pixels have been changed and can decide if the red-eye removal was a success. If the operator decides that not enough of the red-eye pixels have been removed, or if he decides that too many non red-eye pixels have been changed as well, then the size of the elliptical cylinder must be changed. If not enough red-eye pixels have been changed, then the size of the elliptical cylinder must be increased so as to include more color and luminance values. In the opposite case, the size of the elliptical cylinder must be decreased to exclude colors and luminances values.

The present invention defines the color region to be an elliptical cylinder and then 'parameterizes' the change in its size using a single parameter, which may be denoted "degree." This is done as a scale factor in which "degree" starts out equal to 1.0. Thus, the parameter a', b', c' and Tau' may be defined as:

$$a' = a*\text{"degree"}$$

$$b' = b*\text{"degree"}$$

$$c' = c*\text{"degree"} \text{ and}$$

$$Tau' = Tau*\text{"degree"}.$$

These primed parameters are used to define the elliptical cylinder during subsequent processing. If the operator is still not satisfied, the "degree" may be further incremented up or down until a satisfactory result is obtained. The initial values are used only for the first area of red-eye within a given frame and any subsequent changes become the starting point for the second and subsequent areas within the given frame.

Since the original relative size and shape of the elliptical cylinder defines the region in color space containing the red-eye colors, and further since the above process effects a centering of the region on the red-eye colors, this simple 'parameterization' is sufficient to make any adjustments required to separate red-eye colors form non red-eye colors if applied only inside the defined spatial region (rectangle) 20.

The color correction mechanism described above may employ a set of fourteen parameters for each object to be changed, specifically: the spatial limits of the (rectangular) mask 20 (four parameters), the color targeted for change (three parameters), the dimensions of the volume in color space centered on the targeted color (three parameters), the color and density of the destination change (three parameters) and the rate or speed of 'softening' or 'fall-off' of the color at the edge of the color region (one parameter). Advantageously, because this latter control function requires only a single parameter, adjustment of the color control program is greatly facilitated.

It should be noted that the specific application of the color correction mechanism of the present invention to 'red-eye' removal obviates the need to specify the destination color, as the final result, i.e. the creation of a dark neutral, is always the same regardless of the color of the surrounding iris. However, the final density must be delineated. The pupil of a person in shadow should be set darker than those of a person whose face is brightly lit. For this purpose, the final density should be a function of the current value and the average of the surroundings. This takes advantage of the observation that the normal reflectance of a pupil is roughly proportional to the reflectance of the skin. Namely, the average amount of light reflected from the surrounding skin offers an indication of the amount of light that would be reflected by the eye in the absence of 'red-eye'.

Consolidating the definition of the chrominance, luminance elliptical cylinder (the size of the chrominance ellipse, the extent of the luminance limits and the 'fall-off' parameter) into a single control parameter, all may be adjusted proportionately. As a result, the range of the color affected, and therefore the number of pixels affected, varies accordingly. This very useful simplification (multiple parameters into one) reflects other characteristics of the constrained nature of the fact that red-eyes are very different from surrounding colors, and that the difference in luminance between the average dark of the pupil and the average surround is essentially constant.

In accordance with the above-described signal processing mechanism, the change in the original chrominance component of the sample (ISQS), regardless of where the pixel is located, is accomplished by moving towards a common target point Pt in color space, thereby collapsing any color variation. Alternatively, the chrominance component may be corrected in the same manner as the luminance component is corrected, namely 'by' a constant offset, rather than 'to' a constant offset. In this manner, the chrominance contour may be maintained, just as the luminance contour is maintained, providing a more natural appearing result. This methodolgy is particularly useful in correcting changes in the color of a person's hair, where color variation is very important.

In the case where the color offset is a change to a non-neutral value, collapsing of the color range would be necessary. This may be accomplished by collapsing the color range of the object by an amount inversely proportional to the saturation of the destination color. In this case, if the destination color is a neutral, the saturation would be zero and the object's range would collapse to a point.

As will be appreciated from the foregoing description, precision recoloring of one or more selected spatial regions of a color image (e.g. a 'red-eye' pupil) is accomplished in accordance with the present invention by means of a digital image signal processing mechanism which employs a chrominance modification discriminator that conforms with the tendency of an object's color to exhibit a fairly narrow range of hue over a broader range of saturation. In addition, the mechanism uses weighting coefficients through which chrominance values are corrected to adjust the associated luminance values, so as to allow specular highlights in objects, such as glints in eyes (for correction of the 'red-eye' phenomenon) to be unaffected, while the remainder of the object may be darkened.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method of controllably modifying a color characteristic of a colored image that has been spatially sampled to obtain a plurality of color-representative data values, each of which is associated with a respective sampling location within said image comprising the steps of:
    (a) defining a region within said image whereat a color characteristic may be selectively modified;
    (b) forming a visual representation of a color variation characteristic that is bounded by a regular geometric shape, surrounding a target color;
    (c) for each sampling location within said region, identifying whether or not the color represented by its associated data value is located within the regular geometrical shape of the color variation characteristic defined in step (b); and
    (d) for a sampling location, the color-representative data value for which has been identified in step (c) as being located within said regular geometrical shape, modifying its identified color-representative data value to a value that is representative of a 'destination' color.

2. A method according to claim 1, wherein said color variation characteristic is geometrically centered at said target color.

3. A method according to claim 2, wherein said target color is determined in accordance with a prescribed relationship among the color-representative data values associated with plural spatial sampling locations within said region and said regular geometrical shape.

4. A method according to claim 3, wherein said color variation characteristic is geometrically centered at a target color corresponding to the average of the color-representative data values associated with selected spatial sampling locations within said region and said regular geometrical shape.

5. A method according to claim 4, wherein step (b) comprises the steps of:
    (b1) determining a first average of a plurality of color-representative data values, for a specified spatial location within said region and a plurality of spatial sampling locations surrounding said selected spatial location and geometrically centering said color variation characteristic at a color corresponding to said first average;
    (b2) determining a second average of color-representative data values associated with all of the spatial sampling locations within said region and said regular geometrical shape;
    (b3) substituting said second average of color-representative data values for said first average so as to recenter said color variation characteristic at a color corresponding to said second average;
    (b4) repeating steps (b2) and (b3) until the difference between successive average iterations is less than a preselected value; and
    (b5) defining said target color as the center of said color variation characteristic that was last recentered in step (b3).

6. A method according to claim 5, wherein each of said first and second averages is a respective weighted average.

7. A method according to claim 6, wherein, for each weighted average determined in step (b2), the geometrical shape of said color variation characteristic is defined in accordance with a prescribed set of geometry-defining parameters.

8. A method according to claim 6, wherein, for each weighted average determined in step (b2), the size of said color variation characteristic is adjusted, as necessary, to encompass a preselected number of spatial sampling locations within said average.

9. A method according to claim 1, wherein said color variation characteristic is an elliptically shaped chrominance variation characteristic, the major axis of which coincides with the saturation direction of a chrominance coordinate system and the minor axis of which coincides with a direction orthogonal to the saturation direction of said chrominance coordinate system.

10. A method according to claim 9, wherein the intersection of the major and minor axes of said elliptically shaped chrominance variation characteristic coincides with the origin of said chrominace coordinate system, centered at said target color.

11. A method according to claim 1, wherein step (d) comprises modifying said identified color-representative data value to said 'destination' color representative value in accordance with a prescribed relationship between the location of said identified color data value within said color variation characteristic and the perimeter of said regular geometrical shape.

12. A method according to claim 11, wherein step (d) comprises the steps of
    (d1) for a sampling location the color-representative data value for which has been identified in step (c) as lying within said regular geometrical shape, specifying a color representative value that is representative of said 'destination' color, and
    (d2) adjusting the 'destination' color representative value specified in step (d1) in accordance with a prescribed relationship between the geometrical location of said identified color data value within said regular geometrical shape and the border of said prescribed regular geometrical shape.

13. A method according to claim 12, wherein said color variation characteristic is a an elliptically shaped chrominance variation characteristic, the major axis of which coincides with the saturation direction of a chrominance coordinate system and the minor axis of which coincides with a direction orthogonal to the saturation direction of said chrominance coordinate system.

14. A method according to claim 13, wherein the intersection of the major and minor axes of said elliptically shaped chrominance variation characteristic coincides with the origin of said chrominance coordinate system centered at said target color.

15. A method according to claim 12, wherein step (d2) includes adjusting the value of the chrominance of said 'destination' color specified in step (d1) by a chrominance weight that is established in accordance with a prescribed relationship between the geometrical location of said identified color data value within said regular geometrical shape and the border of said regular geometrical shape, and defining the value of the luminance of said 'destination' color specified in step (d1) in accordance with said chrominance weight.

16. A method according to claim 15, wherein step (d2) includes the step of defining the value of the luminance of said 'destination' color specified in step (d1) as the value of the luminance of said image at said identified sampled location, modified by an offset based upon the difference in luminance of said target color and said 'destination' color, said difference in luminance being weighted in accordance with said chrominance weight and a luminance weight that is established in accordance with a prescribed relationship between the geometrical location of said identified color data value and the extent of a prescribed range of luminance variation projected from said regular geometrical shape.

17. A method according to claim 1, wherein step (b) comprises the step of defining said color variation characteristic in terms of a chrominance coordinate system the origin of which is centered at said target color, said color variation characteristic having a regular geometrical shape that is centered about the origin of said chrominance coordinate system.

18. A method according to claim 17, wherein step (c) comprises, for each sampling location within said region, defining the color represented by its associated data value in terms of chrominance and luminance components, and identifying whether or not the its chrominance components lies within the regular geometrical shape of the color variation characteristic defined in step (b).

19. A method according to claim 18, wherein step (d) comprises, for a sampling location the chrominance component of the color-representative data value for which has been identified in step (c) as lying within said regular geometrical shape, modifying the value of the chrominance component thereof to a chrominance value that is associated with of a 'destination' color.

20. A method according to claim 19, wherein step (d) comprises the steps of
(d1) for a sampling location the chrominance component for which has been identified in step (c) as lying within said regular geometrical shape, specifying a chrominance value that is associated with said 'destination' color, and
(d2) adjusting the 'destination' color associated chrominance value specified in step (d1) in accordance with a prescribed relationship between the geometrical location of said identified chrominance component within said regular geometrical shape and the border of said prescribed regular geometrical shape.

21. A method according to claim 20, wherein step (d2) includes adjusting the value of the chrominance component of said 'destination' color specified in step (d1) by a chrominance weight that is established in accordance with a prescribed relationship between the geometrical location of said identified chrominance component within said regular geometrical shape and the border of said regular geometrical shape, and defining the value of the luminance component of said 'destination' color specified in step (d1) in accordance with said chrominance weight.

22. A method according to claim 21, wherein step (d2) includes the step of defining the value of the luminance component of said 'destination' color specified in step (d1) as the value of the luminance component of said image at said identified sampled location, modified by an offset based upon the difference in the value of the luminance component of said target color and that of said 'destination' color, said luminance value difference being weighted in accordance with said chrominance weight and a luminance weight that is established in accordance with a prescribed relationship between the geometrical location of the luminance component that is associated with said identified chrominance component location and the extent of a prescribed range of luminance variation projected from said regular geometrical shape.

23. A method according to claim 22, wherein said color variation characteristic is a an elliptically shaped chrominance variation characteristic, the major and minor axes of which intersect at the origin of said chrominance coordinate system, and wherein said major axis coincides with the saturation direction of said chrominance coordinate system and said minor axis coincides with a direction orthogonal to the saturation direction of said chrominance coordinate system.

24. A color image processing system comprising:
an image converter for generating a plurality of output signals representative of color characteristics of a plurality of spatial locations within a color image, prescribed color characteristics of which are to be controllably modified;
a digital converter coupled to receive the output signals from said image converter and generating a plurality of digital code signals, respectively representative of the color characteristics of said image at said plurality of spatial locations; and
a digital signal processor which receives digital codes generated by said digital converter and controllably modifies selected ones of said digital codes so as to effect a modification of a color characteristic of said color image in accordance with a program through which the following steps (a)-(d) are executed:
(a) defining a spatial region within said image whereat a color characteristic may be selectively modified;
(b) forming a visual representation of a color variation characteristic that is bounded by a regular geometric shape, surrounding a target color;
(c) for each sampling location within said spatial region, identifying whether or not the color represented by its associated digital code is located within the regular geometrical shape of the color variation characteristic defined in step (b); and
(d) for a sampling location, the digital code for which has been identified in step (c) as being representative of a color located within said regular geometrical shape, modifying its identified digital code to a changed digital code which is representative of a 'destination' color.

25. A system according to claim 24, wherein said color variation characteristic is an elliptically shaped chrominance variation characteristic, the major axis of which coincides with the saturation direction of a chrominance coordinate system and the minor axis of which coincides with a direction orthogonal to the saturation direction of said chrominance coordinate system.

26. A system according to claim 25, wherein the intersection of the major and minor axes of said elliptically shaped chrominance variation characteristic coincides with the origin of said chrominance coordinate system, centered at said target color.

27. A system according to claim 24, wherein step (d) comprises modifying said identified digital code to said changed code in accordance with a prescribed relationship between the location of the color represented by said digital code within said color variation characteristic and the perimeter of said regular geometrical shape.

28. A system according to claim 27, wherein step (d) comprises the steps of
 (d1) for a sampling location the color represented by the digital code for which has been identified in step (c) as lying within said regular geometrical shape, specifying a color representative digital code that is representative of said 'destination' color, and
 (d2) adjusting said 'destination' color representative digital code specified in step (d1) in accordance with a prescribed relationship between the geometrical location of said identified color within said regular geometrical shape and the border of said prescribed regular geometrical shape.

29. A system according to claim 28, wherein said color variation characteristic is a an elliptically shaped chrominance variation characteristic, the major axis of which coincides with the saturation direction of a chrominance coordinate system and the minor axis of which coincides with a direction orthogonal to the saturation direction of said chrominance coordinate system.

30. A system according to claim 29, wherein the intersection of the major and minor axes of said elliptically shaped chrominance variation characteristic coincides with the origin of said chrominance coordinate system centered at said target color.

31. A system according to claim 28, wherein step (d2) includes adjusting the value of the chrominance of said 'destination' color specified in step (d1) by a chrominance weight that is established in accordance with a prescribed relationship between the geometrical location the identified color within said regular geometrical shape and the border of said regular geometrical shape, and defining the value of the luminance of said 'destination' color specified in step (d1) in accordance with said chrominance weight.

32. A system according to claim 31, wherein step (d2) includes the step of defining the value of the luminance of said 'destination' color specified in step (d1) as the value of the luminance of said image at said identified sampled location, modified by an offset based upon the difference in luminance of said target color and said 'destination' color, said difference in luminance being weighted in accordance with said chrominance weight and a luminance weight that is established in accordance with a prescribed relationship between the geometrical location of said identified color and the extent of a prescribed range of luminance variation projected from said regular geometrical shape.

33. A system according to claim 24, wherein step (b) comprises the step of defining said color variation characteristic in terms of a chrominance coordinate system the origin of which is centered at said target color, said color variation characteristic having a regular geometrical shape that is centered about the origin of said chrominance coordinate system.

34. A system according to claim 24, wherein step (c) comprises, for each sampling location within said spatial region, defining the color represented by its associated digital code in terms of chrominance and luminance components, and identifying whether or not the its chrominance component lies within the regular geometrical shape of the color variation characteristic defined in step (b).

35. A system according to claim 34, wherein step (d) comprises, for a sampling location the chrominance component of the color value represented by the digital code for which has been identified in step (c) as lying within said regular geometrical shape, modifying the value of the chrominance component thereof to a chrominance value that is associated with of a 'destination' color.

36. A system according to claim 35, wherein step (d) comprises the steps of
 (d1) for a sampling location the chrominance component for which has been identified in step (c) as lying within said regular geometrical shape, specifying a chrominance code that is associated with said 'destination' color, and
 (d2) adjusting the 'destination' color associated chrominance code specified in step (d1) in accordance with a prescribed relationship between the geometrical location of said identified chrominance component within said regular geometrical shape and the border of said prescribed regular geometrical shape.

37. A system according to claim 36, wherein step (d2) includes adjusting the value of the chrominance component of said 'destination' color specified in step (d1) by a chrominance weight that is established in accordance with a prescribed relationship between the geometrical location of said identified chrominance component within said regular geometrical shape and the border of said regular geometrical shape, and defining the value of the luminance component of said 'destination' color specified in step (d1) in accordance with said chrominance weight.

38. A system according to claim 37, wherein step (d2) includes the step of defining the code value of the luminance component of said 'destination' color specified in step (d1) as the code value of the luminance component of said image at said identified sampled location, modified by an offset based upon the difference in the value of the luminance component of said target color and that of said 'destination' color, said luminance value difference being weighted in accordance with said chrominance weight and a luminance weight that is established in accordance with a prescribed relationship between the geometrical location of the luminance component that is associated with said identified chrominance component location and the extent of a prescribed range of luminance variation projected from said regular geometrical shape.

39. A system according to claim 38, wherein said color variation characteristic is a an elliptically shaped chrominance variation characteristic, the major and minor axes of which intersect at the origin of said chrominance coordinate system, and wherein said major axis coincides with the saturation direction of said chrominance coordinate system and said minor axis coincides with a direction orthogonal to the saturation direction of said chrominance coordinate system.

40. A system according to claim 24, wherein said color variation characteristic is geometrically centered at said target color.

41. A system according to claim 40, wherein said target color is determined in accordance with a prescribed relationship among the color-representative data values associated with plural spatial sampling locations within said region and said regular geometrical shape.

42. A system according to claim 41, wherein said color variation characteristic is geometrically centered at a target color corresponding to the average of the color-representative data values associated with selected spatial sampling locations within said region and said regular geometrical shape.

43. A system according to claim 42, wherein step (b) comprises the steps of:
  (b1) determining a first average of a plurality of color-representative data values, for a specified spatial location within said region and a plurality of spatial sampling locations surrounding said selected spatial location and geometrically centering said color variation characteristic at a color corresponding to said first average;
  (b2) determining a second average of color-representative data values associated with all of the spatial sampling locations within said region and said regular geometrical shape;
  (b3) substituting said second average of color-representative data values for said first average so as to recenter said color variation characteristic at a color corresponding to said second average;
  (b4) repeating steps (b2) and (b3) until the difference between successive average iterations is less than a preselected value; and
  (b5) defining said target color as the center of said color variation characteristic that was last recentered in step (b3).

44. A system according to claim 43, wherein each of said first and second averages is a respective weighted average.

45. A system according to claim 44, wherein, for each weighted average determined in step (b2), the geometrical shape of said color variation characteristic is defined in accordance with a prescribed set of geometry-defining parameters.

46. A system according to claim 44, wherein, for each weighted average determined in step (b2), the size of said color variation characteristic is adjusted, as necessary, to encompass a preselected number of spatial sampling locations within said average.

* * * * *